INVENTORS
ARTHUR G. OSTERGREN
LUIGI C. SALCE

April 29, 1969   A. G. OSTERGREN ET AL   3,440,706
APPARATUS FOR BENDING LOCKING TABS AND THE LIKE
Filed Sept. 5, 1967

INVENTORS
ARTHUR G. OSTERGREN
LUIGI C. SALCE
BY McCormick, Paulding & Huber
ATTORNEYS United States Patent Office 3,440,706
Patented Apr. 29, 1969

3,440,706
APPARATUS FOR BENDING LOCKING TABS
AND THE LIKE
Arthur G. Ostergren, Whitebirch Road, East Hampton,
Conn. 06424, and Luigi C. Salce, Green Acres Lane,
Quinebaug, Conn. 06262
Filed Sept. 5, 1967, Ser. No. 665,620
Int. Cl. B23p 11/00; B21d 11/02
U.S. Cl. 29—243.5          13 Claims

ABSTRACT OF THE DISCLOSURE

Tab bending and rivet flaring apparatus comprising a rotatable work holder for a cylindrical workpiece carrying a circumaxially spaced series of tabs or rivets, a back-up anvil movable toward and away from a work station to engage the tabs or rivets, and three power-operated bending or flaring tools arranged respectively along the anvil centerline but opposed thereto, and on one and an opposite side of the anvil centerline, the latter two tools being adapted for pre-bending.

Background of the invention

Within the knowledge of the applicants, series of tabs or rivets arranged on a workpiece are bent or flared in a manual sequential operation which may involve a single hand or power-operated tool, the latter being moved manually from tab to tab or rivet to rivet.

Summary of the invention

It is the general object of the present invention to provide apparatus for bending tabs and the like wherein a workpiece carrying a series of tabs to be bent is mounted on a movable work holder adapted to present the tabs successively to a work station, and wherein a plurality of power-operated bending tools is provided at the work station for pre-bending, bending, etc. in a high speed and highly efficient operation, the overall task of tab bending thus being expedited in substantial degree.

In fulfillment of this object, apparatus is provided in accordance with the invention wherein a work holder is employed to support a workpiece and to move the same whereby to present successively to a work station a series of tabs arranged on the workpiece. The work holder shown and described below is particularly adapted for the support and movement of a rotatable workpiece having tabs arranged thereon in a circumaxially spaced series but it is to be understood that the invention is not so limited. A back-up anvil is provided at the work station and relative movement between the back-up anvil and the work holder is provided for to effect engagement and disengagement between the anvil and a rear portion of a tab positioned at the work station. At least one power-operated movable tab bending tool is also provided and is disposed adjacent the work station in a position generally opposed to the back-up anvil. Preferably, three power-operated reciprocable bending tools are provided with a first tool arranged approximately along the centerline of the back-up anvil and with the second and third tools angularly arranged with respect to the first tool and disposed on opposite sides thereof for pre-bending operations. The bending tools are operable successively to bend selected portions of tabs as they are presented to the work station and engaged by the anvil.

The drawings show a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

Brief description of the drawings

FIG. 4 is a fragmentary vertical transverse section taken generally as indicated at 4—4 in FIG. 2 and illustrating slide and hold-down devices;

FIG. 5 is a fragmentary horizontal section taken generally as indicated at 5—5 in FIG. 1 and illustrating a mechanism for operating a back-up anvil in its movement toward and away from engagement with tabs on a workpiece;

Description of the preferred embodiment

Figure 1:
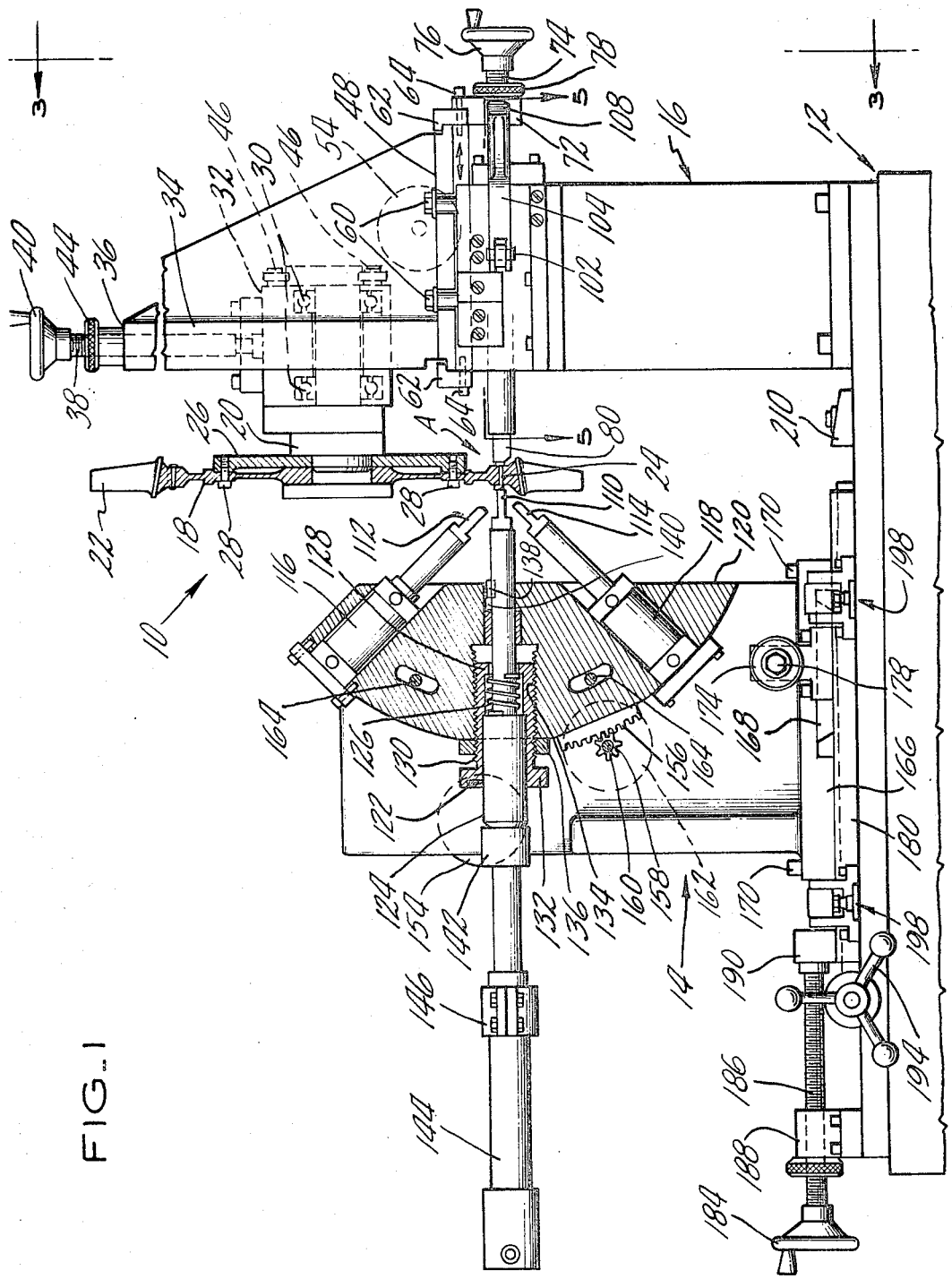
FIG. 1 is a somewhat schematic side elevation of the apparatus of the present invention with portions thereof shown in section.
Figure 2:
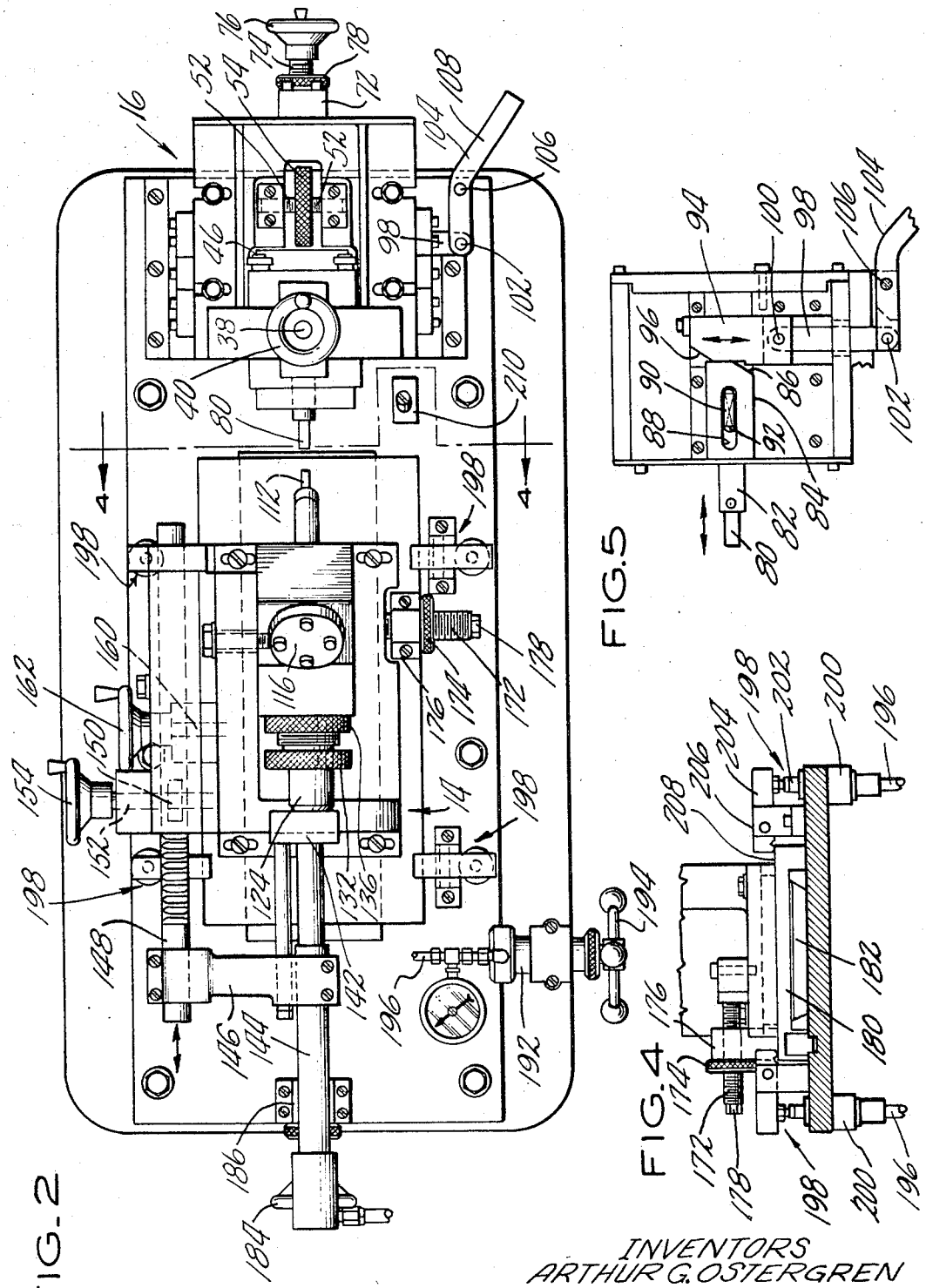
FIG. 2 is a somewhat schematic top view of the apparatus of FIG. 1.
Figure 3:
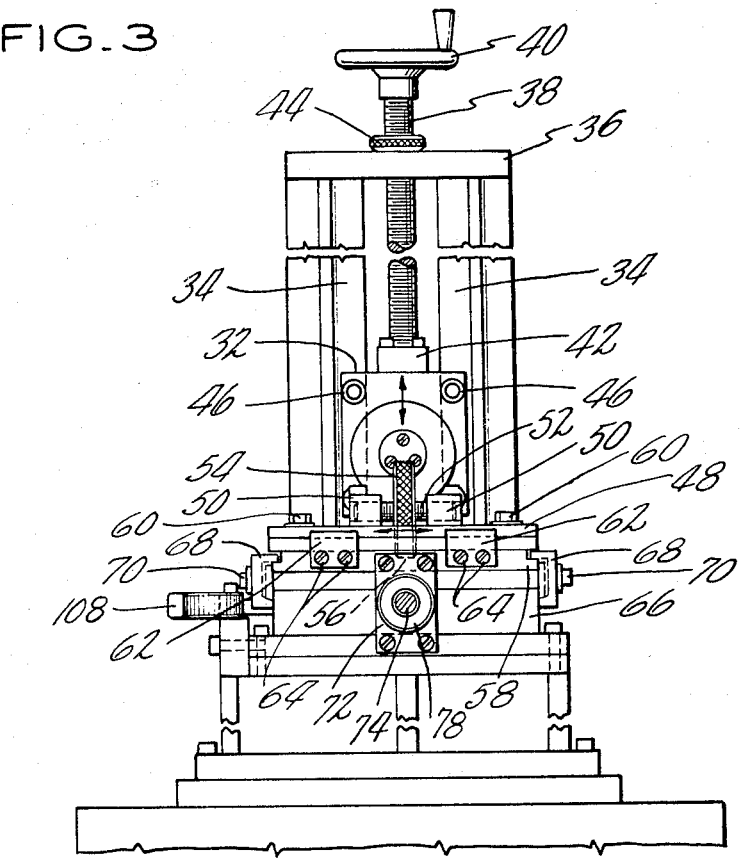
FIG. 3 is a right-hand end elevation of the apparatus taken generally as indicated at 3—3 in FIG. 1.

Referring particularly to FIGS. 1 through 3, it will be observed that a tab bending apparatus indicated generally at 10 comprises a base 12 which carries left and right-hand pedestals indicated generally at 14 and 16, respectively. The left-hand pedestal 14 supports power-operated bending tools and provides a plurality of adjustments as will be more fully described hereinbelow. The right-hand pedestal 16 supports a work holder and a back-up anvil to be described more fully hereinbelow and a work station A is defined between the left and right-hand pedestals and adjacent the back-up anvil and bending tools.

As previously mentioned, workpieces of various configurations can be accommodated within the scope of the invention, but a cylindrical workpiece 18 is shown and a rotatable work holder 20 is provided accordingly. The workpiece 18 takes the form of an aircraft turbine or compressor wheel or disc having a circumaxially spaced series of turbine or compressor blades 22 which are at least partially secured in position by a series of locking tabs or rivets, a locking tab being shown at 24 at the work station A. The wheel or disc 18 is mounted on an adapter 26 by means of suitable bolts 28, 28 and may be held by the adapter in a vertical attitude or in other angular positions as desired.

The adapter 26 is carried by the work holder 20 which in the preferred embodiment shown takes the form of a rotatable spindle journalled in appropriate bearings 30, 30. The bearings 30, 30 are mounted within a bearing block or slide 32, FIGS. 1 and 3, which is movable vertically along guide and support members 34, 34. At the upper end portions of the guide and support members 34, 34 a transverse member 36 is connected therebetween and is provided with a threaded opening for a correspondingly threaded adjusting rod 38.

The adjusting rod 38 has a small hand wheel 40 secured at an upper end portion thereof and a lower end portion thereof is secured for rotation in but is fixed vertically with respect to a small mounting block 42 atop the bearing block 32. As will be apparent from the foregoing, the spindle 20 can be readily rotated for rotation of the adapter 26 and the workpiece 18 whereby to index tabs or rivets on the workpiece or, more specifically, to present the tabs or rivets successively to the work station A. It will further be apparent that vertical adjustment of the workpiece is provided for through suitable rotation of the hand wheel 40, the threaded rod 38, and vertical sliding movement of the bearing block 32. Means for locking the workpiece in a desired vertical position is provided in the form of a lock nut 44 and suitable binder bolts 46, 46 mounted in the bearing block 32 and engageable with the aforementioned guide and support members 34, 34.

A horizontal support plate 48 for the vertically extending guide and support members 34, 34 carries the said members and all elements supported thereby and provides for transverse horizontal or side-to-side adjustment of such elements including the workpiece 18 and a tab 24 at the work station A. The plate 48 has mounted on an upper surface thereof a pair of small mounting blocks 50, 50, best shown in FIG. 3, which fixedly support and secure a small threaded rod 52. An adjusting wheel 54 threadably mounted on the rod 52 has a lower end portion thereof entered in an appropriate notch 56 in a horizontal longitudinally movable slide plate 58 arranged beneath and in supporting relationship with the plate 48. Thus, it will be seen that the adjusting wheel 54 can be rotated to effect horizontal transverse adjustment of the plate 48 and the elements carried thereby. Binder bolts 60, 60 can be employed to secure the plate 48 in adjusted position and small guides 62, 62 for the plate 48 are mounted to the plate 58 by bolts 64, 64. Thus, the bolts 64, 64 may be withdrawn slightly to allow adjustment of the plate 48 and thereafter tightened to assist in retaining the plate in adjusted position.

As best illustrated in FIG. 3, the horizontal longitudinally or forwardly and rearwardly adjustable plate 58 is mounted on an upper portion 66 of the pedestal 16 and has associated guides 68, 68 with clamp bolts 70, 70 entered therethrough. A bracket 72 mounted on and depending from the plate 58 has a threaded opening therein receives a threaded adjusting rod 74, FIG. 1. A hand wheel 76 is mounted on an outer end portion of the rod 74 and a lock nut 78 is provided thereon adjacent the bracket 72. An inner end portion of the rod 74 is secured rotatably in the pedestal portion 66 whereby the hand wheel 76 can be turned to rotate the rod 74 and to effect a desired horizontal longitudinal adjustment of the plate 58. As will be apparent, the entire assembly thereabove comprising the plate 48, the guides 34, 34, etc. is moved with the plate 58 to effect movement of the workpiece 18 and tabs such as 24 thereon in a horizontal longitudinal or left to right direction.

There is mounted within the pedestal portion 66 a mechanism for operating a back-up anvil 80 shown in FIG. 1 in operative position in engagement with a rear portion of the tab 24 at the work station A. The operating mechanism for the anvil is best illustrated in FIG. 5. A holder 82 for the anvil 80 is carried by a small horizontal longitudinal slide 84 provided with a cam surface 86 at a rear corner portion. The slide 84 also has a slot 88 which receives a return spring 90 engaged with a rear wall of the slot and a fixed pin 92. An operating slide 94 moves in a transverse horizontal direction and is provided at a forward corner with an inclined cam surface 96, complementary to the cam surface 86. With the operating slide 94 in the position shown in FIG. 5, the anvil is held forwardly in its operating position and in engagement with a tab. On withdrawal of the operating slide 94 from its position behind the slide 84, the return spring 90 urges the slide 84, the holder 82, and the anvil 80 rightwardly to an inoperative position whereupon the anvil is disengaged from a rear portion of a tab 24 at the work station A to permit indexing of the workpiece 18 and presentation of a subsequent tab on the workpiece to the work station A.

Mechanism for moving the operating slide 94 to the position shown and to a withdrawn position wherein the slide 84 is permitted to move rearwardly at the urging of the spring 90 comprises a link 98 pivotally connected at 100 to the slide 94 and pivotally connected at an opposite end portion 102 to an operating lever 104. The operating lever 104 is mounted on a pivot pin 106 so as to be movable manually at an outer or rear end portion 108, FIG. 2, toward and away from the apparatus by the operator thereof. When the end portion 108 of the lever 104 is moved away from the apparatus, or in a clockwise direction, by an operator of the apparatus the slide 94 is moved to the operative position shown. Conversely, counter-clockwise or inward movement of the end portion 108 of the lever 104 serves to withdraw the operating slide 94 and to permit the anvil to move rightwardly and disengage from a tab rear portion at the work station A.

Reverting now to FIG. 1, and inviting attention particularly to the pedestal 14 and the elements carried thereby, it will be observed that first, second, and third bending or flaring tools are provided respectively at 110, 112, and 114. The tools 110, 112, and 114 are mounted respectively in appropriate holders and are reciprocable along angularly related centerlines toward and away from an end portion of a tab arranged to be bent at the working station A. Specifically, the tool 110 is reciprocable along a centerline which is generally parallel with and generally coincident with the centerline of the anvil 80. The second tool 112 is reciprocable along a centerline which extends downwardly and rightwardly toward the tab and which is angularly related with the centerline of the tool 110 and the tool 114 is similarly reciprocable along an angularly related centerline which extends upwardly and rightwardly toward the tab. Preferably, the centerlines of the tools at least approximately intersect and the tools 112 and 114 may be considered tab pre-bend tools while the tool 112 may be regarded as a finish or bend tool.

In the preferred embodiment of the invention shown, the tools 112 and 114 are power-operated by suitable hydraulic cylinders 116 and 118 mounted in a head 120. The tool 110 has its holder mounted on a slide rod 122 which has a diametrically enlarged rear portion 124 engageable at its forward end portion with a return spring 126. The forward end portion of the spring 126 is seated against an annular flange 128 on a threaded adjusting sleeve 130 disposed about the slide rod 122. The adjusting sleeve 130 has a diametrically enlarged outer end portion 132 which may be conveniently manipulated manually to turn the sleeve forwardly and rearwardly in threaded bore 134 and to thereby effect a fine adjustment of the tool 110. A lock nut is provided at 136 and a stop means for limiting the return stroke of the tool 110 under the influence of the spring 126 is provided in the form of a key 138 and a keyway 140.

Power-operating means for bending tool 110 preferably comprises an air impact hammer comprising a ram 142 and a cylinder 144. The cylinder 144 is supported by a bracket 146 and in order to provide for adjustment thereof of the bracket 146 is mounted on a rack 148, best illustrated in FIG. 2. The rack 148 is adjusted horizontally and longitudinally or forwardly and rearwardly by means of a pinion 150 carried on a shaft 152 in turn operated by means of a hand wheel 154.

As will be apparent, angular adjustment of the aforementioned tool centerlines can be effected in unison and in like magnitude through angular adjustment of the head 120 in a vertical plane relative to the pedestal 14. A short rack 156 mounted on the head 118 has an associated pinion 158 mounted on a shaft 160 in turn provided with a hand wheel 162, FIGS. 1 and 2. Thus, the hand wheel 162 may be rotated to effect desired angular adjustment of the head 120 and to adjust the centerlines of the tools 110, 112, and 114 as may be required for particular bending requirements and binder bolts 164, 164 may thereafter be employed to secure the head 120 in adjusted position.

The head 120 is also adjustable bodily together with the pedestal 14 in horizontal longitudinal and horizontal transverse directions. A base plate 166 for the pedestal 14 is adapted for sliding movement in a horizontal transverse direction along a dove-tail guide 168, FIG. 1, binder bolts 170, 170 serving to secure the plate in adjusted position. As best illustrated in FIG. 2, an adjusting screw or rod 172 is provided with a lock nut 174 and extends through and in threaded engagement with a bracket 176 and into the pedestal 14. Thus, with the lock nut 174 in a loosened condition, a nut form 178 at the outer end of the adjusting rod or screw 172 can be turned manually to adjust the pedestal 14 in a horizontal transverse or side-to-side direction.

The plate 166 is mounted on a plate 180 in turn adapted for horizontal longitudinal sliding movement along a dove-tail guide 182 best shown in FIG. 4. Hand wheel 184, FIG. 1, rotates a threaded adjusting rod 186 threadably received in a mounting block 188 on the base 12 and extending to a block 190 mounted on the plate 180. Thus, rotation of the hand wheel 184 may be effected to cause the plate 180 and the entire pedestal assembly 14 supported thereon to move in a horizontal longitudinal direction for adjustment of the tools 110, 112, and 114 relative to a tab such as 24.

While various locking means may be provided for the plate 180, it is the presently preferred practice to employ a hydraulic piston within a cylinder 192 in a hydraulic pressure locking system. The piston within the cylinder 192 is adjusted in position by rotation of a hand wheel 194 whereby to vary hydraulic pressure within appropriate conduits, indicated generally at 196, 196 and which extend to four similar locking devices 198, 198. As best illustrated in FIG. 4, each of the locking devices 198 comprises a small cylinder piston arrangement 200 having a rod 202 engageable with a locking lever 204. The locking lever 204 is mounted for pivotal movement by means of suitable block 206 and engages at an inner end portion with an upper surface 208 of the aforementioned plate 180. Thus, the hand wheel 198 may be rotated to relieve hydraulic pressure when it is desired to effect adjustment of the position of the plate 180 and thereafter the hand wheel may be rotated in a reverse direction to effect a pressure increase in the cylinders 200, 200 and thereby to lock the plate 180 in a desired position. Preferably, a longitudinally adjustable stop is provided at 210 on the base 12 to limit right-hand or forward movement of the plate 180.

As will be apparent from the foregoing, high speed, automatic operation is achieved with the apparatus of the present invention. Manual indexing of the workpiece 18 is presently employed, but it is contemplated within the invention that automatic indexing means may be provided. While rapid sequential operation of the bending tools 110, 112, and 114 in a tab bending or rivet flaring operation is possible merely with a simplified manually operable control system for the hydraulic cylinders 116, 118 and the impact hammer 144, an automatic sequencing control of known type is preferred and is presently provided. Description and illustration of such system is not essential, however, to an understanding of the present invention and is accordingly omitted herein.

Figure 6:
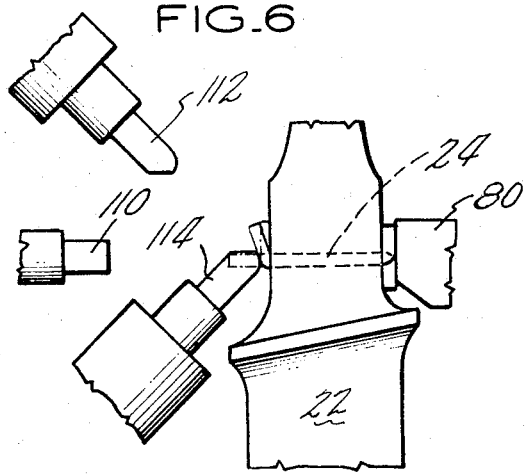
FIG. 6 is an enlarged schematic illustration of the manner in which a locking tab can be bent by the apparatus in a pre-bend and final bend operation.
Figure 7:
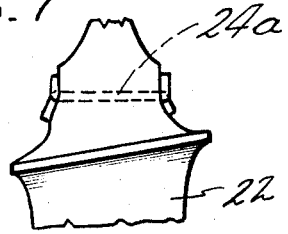
FIG. 7 is a schematic illustration of a locking tab having portions thereof bent in generally opposite radial directions for their locking function.
Figure 8:
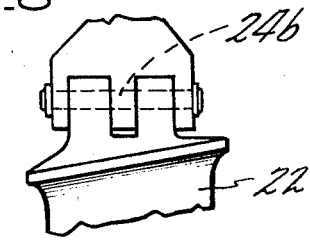
FIG. 8 is a schematic illustration showing a rivet flared by the apparatus of the present invention.

A wide variety of bending operations can be accommodated with the apparatus of the invention. As illustrated in FIG. 6, the tool 114 can be employed as a pre-bending tool to effect a partial bend in an end portion of a tab 24 required to be bent radially inwardly on the workpiece. Thereafter, completion of the bending operation can be achieved with the tool 110. Alternatively, and when a tab end portion is to bent radially outwardly, the tool 112 may be used for a pre-bend operation and the tool 110 for a finish operation. In FIG. 7 there is illustrated a tab 24a which has a split end portion with one portion thereof bent generally radially inwardly and a second portion thereof bent radially outwardly. Such bending operations are readily accommodated with the apparatus of the invention. In FIG. 8 there is shown a rivet 26b which has been flared in an appropriate operation of the apparatus of the present invention.

We claim:

1. Apparatus for bending a selected portion of each of a series of locking tabs or the like in assembled position on a workpiece, said apparatus comprising a back-up anvil disposed adjacent a work station, a workpiece holder for supporting a workpiece with a first assembled but unbent tab thereon disposed at the work station with one portion of the tab positioned to be engaged by the back-up anvil and an opposed portion thereof accessible for bending, said workpiece holder being adapted to accommodate workpiece movement successively to present additional tabs thereon to said work station in the condition and position of said first tab and said back-up anvil and workpiece holder being adapted for relative movement between the workpiece and anvil to effect engagement between the anvil and said one portion of a tab at the work station, and at least one power operated moveable tab bending tool disposed adjacent said work station in a position generally opposed to said back-up anvil and operable successively to bend selected portions of tabs as they are presented to the work station by workpiece movement and engaged by the back-up anvil.

2. Apparatus for bending locking tabs or the like as set forth in claim 1 wherein means is provided for moving said back-up anvil to and from an operative position at said work station and for thereby effecting said relative workpiece and anvil movement.

3. Apparatus for bending locking tabs or the like as set forth in claim 1 wherein means is provided for adjusting said workpiece holder in at least one direction to effect workpiece adjustment and precise registry of said first tab with said back-up anvil at the work station.

4. Apparatus for bending locking tabs or the like as set forth in claim 1 wherein said workpiece holder is adapted to support and accommodate rotary movement of a generally circular workpiece having an annular series of unbent tabs assembled therewith.

5. Apparatus for bending locking tabs or the like as set forth in claim 4 wherein said workpiece holder comprises a rotatable mounting spindle adapted to support an adapter element and/or generally circular workpiece, and wherein there is provided means for adjusting said spindle in three discrete directions.

6. Apparatus for bending locking tabs or the like as set forth in claim 1 wherein first and second power operated tab bending tools are provided and are arranged for reciprocable movement toward and away from a selected tab portion along angularly related centerlines.

7. Apparatus for bending locking tabs or the like as set forth in claim 6 wherein said first and second tab bending tools are mounted on a common adjustable head which effects angular adjustment of said tool centerlines in unison and in like magnitude.

8. Apparatus for bending locking tabs or the like as set forth in claim 6 wherein a third reciprocable power operated tab bending tool is provided and arranged with its centerline of reciprocable movement in angular relationship with those of said first and second tab bending tools, said first tool being useable as a bend or finish tool having its centerline of movement generally parallel and generally coincident with that of the back-up anvil, and said second and third tools being useable as prebend tools and being disposed on opposite sides of said first tool and having their centerlines of movement in at least approximate intersection with each other and with the centerline of said first tool.

9. Apparatus for bending locking tabs or the like as set forth in claim 7 wherein said three tab bending tools are mounted on a common head for angular adjustment, and wherein means is provided for adjusting said head bodily toward and away from said work station and back-up anvil and from side-to-side with respect thereto.

10. Apparatus for bending locking tabs or the like as set forth in claim 9 wherein said first tab bending tool is provided with means for effecting a fine adjustment toward and away from the work station independently of the aforesaid adjustment means.

11. Apparatus for bending locking tabs or the like as set forth in claim 8 wherein fluid operable cylinders are provided for operating said three tab bending tools.

12. Apparatus for bending locking tabs or the like as set forth in claim 11 wherein a pneumatic cylinder of the impact type is provided for operating said first bending tool, and wherein hydraulic cylinders are provided for operating said second and third bending tools.

13. Apparatus for bending locking tabs or the like as set forth in claim 12 wherein means is provided for adjusting the impact delivered by said pneumatic cylinder to said first bending tool.

References Cited

UNITED STATES PATENTS

| | | | |
|---|---|---|---|
| 2,653,547 | 9/1953 | Langdon | 29—23.5 |
| 3,068,555 | 12/1962 | Thomas | 29—513 |

RONALD D. GREFE, *Primary Examiner.*

U.S. Cl. X.R.

72—297, 306